Feb. 25, 1941.

J. R. WILSON 2,233,378

OBSTRUCTION REMOVER

Filed Nov. 3, 1938

Inventor

John R. Wilson

By Clarence A. O'Brien
and Hyman Berman

Attorneys

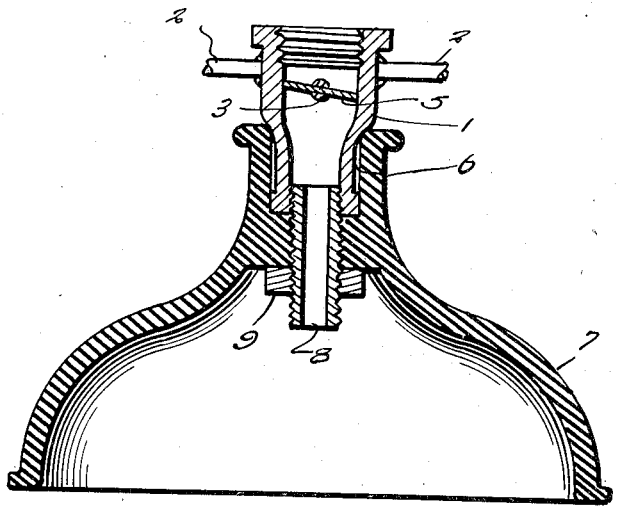
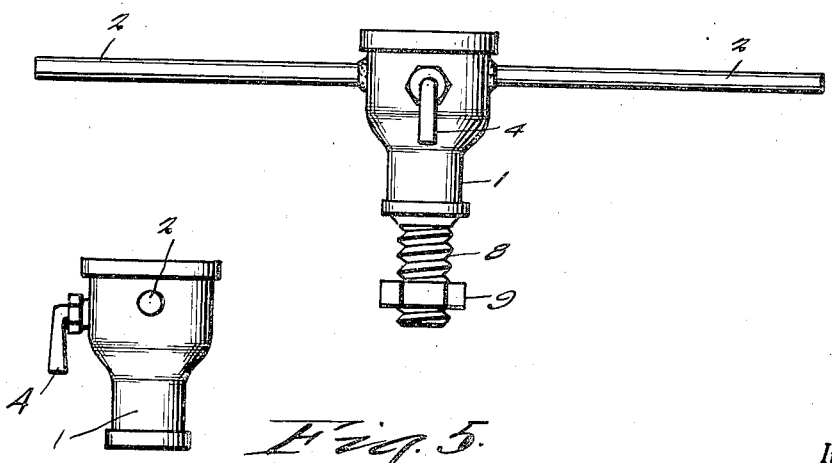

Patented Feb. 25, 1941

2,233,378

UNITED STATES PATENT OFFICE 2,233,378

OBSTRUCTION REMOVER

John R. Wilson, Lawton, Okla.

Application November 3, 1938, Serial No. 238,659

1 Claim. (Cl. 4—256)

The present invention relates to new and useful improvements in obstruction removers for sink and other drains and has for its primary object to provide, in a manner as hereinafter set forth, novel means for connecting a conventional collapsible rubber cup of the type in widespread use at present to a hose to permit the use of water under pressure for cleaning and unclogging a drain.

Another very important object of the invention is to provide an obstruction remover of the aforementioned character comprising valve means whereby the flow of water through device may be conveniently controlled as desired.

Other objects of the invention are to provide an obstruction remover of the class described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 3 is a vertical sectional view, taken substantially on the line 3—3 of Fig. 2.

Figure 4 is a view in front elevation of the connecting device removed from the collapsible cup.

Figure 5 is a view in side elevation thereof.

Figure 1:
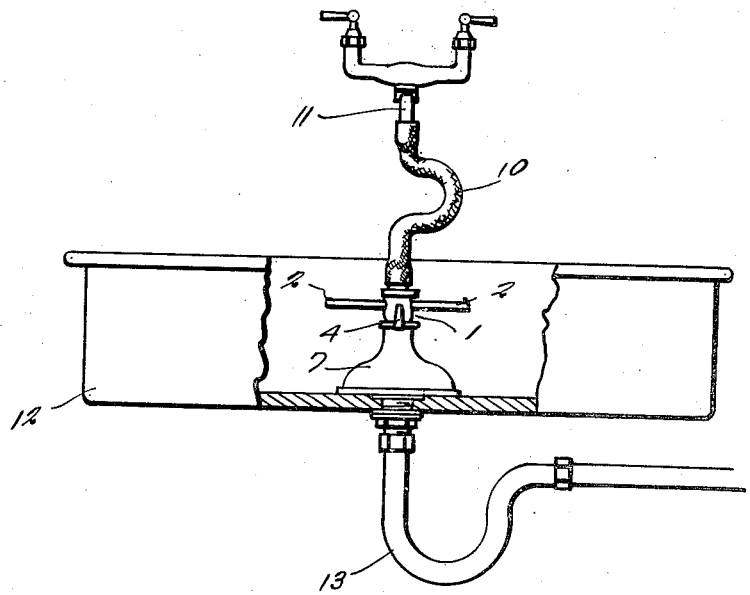
Figure 1 is a view in front elevation, showing an obstruction remover constructed in accordance with the present invention in use.
Figure 2:
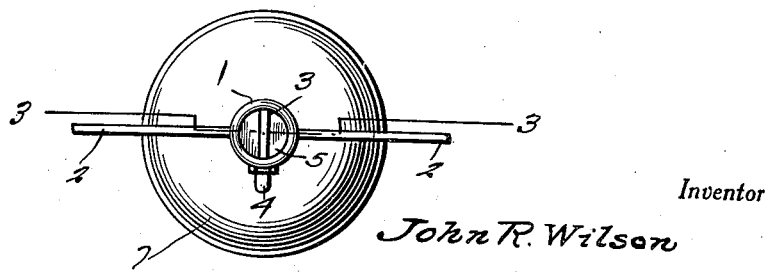
Figure 2 is a top plan view of the device with the hose detached therefrom.

Referring now to the drawings in detail, it will be seen that the embodiment of the invention which has been illustrated comprises a reducing coupling 1 of suitable metal. Projecting from opposite sides of the reducing coupling 1 is a pair of handles 2 of suitable length. Extending rotatably into the coupling 1 is a shaft 3 having an operating handle 4 on its outer end. Fixed on the shaft 3 and operable in the coupling 1 for controlling the flow of water therethrough is a valve 5 of the butterfly type.

The comparatively small lower end portion of the coupling 1 is engageable in the usual socket 6 which rises from a collapsible rubber cup 7. Depending from the comparatively small lower end of the coupling 1 is a nipple 8 which passes through the top of the collapsible cup 7 in a manner to establish communication between said cup and said coupling. A retaining nut 9 for the collapsible cup 7 is screwed on the nipple 8 beneath the upper portion of said collapsible cup.

The reference numeral 10 designates a conventional hose of any suitable length having one end detachably connected to the comparatively large upper end of the coupling 1. As illustrated to advantage in Fig. 1 of the drawings, the other end of the hose 10 is adapted to be connected to a conventional faucet 11 for receiving water under pressure therefrom. The reference numeral 12 designates a sink and 13 is the drain thereof.

It is thought that the manner of using the device will be readily apparent from a consideration of the foregoing. Through the medium of the handles 2, the collapsible rubber cup 7 may be conveniently engaged with the bottom of the sink 12 over the drain 13 and the desired downward pressure exerted thereon. With the hose 10 connected to the faucet 11, of course, and the valve 5 open, water under pressure passes through the coupling 1 into the cup 7 and, being unable to escape, is forced through the drain 13 in a manner to thoroughly clean and unclog same. The operating handle 4 of the valve 5 is so located as to permit said valve to be conveniently operated or adjusted for controlling the flow of water through the device. Of course, the collapsible cup 7 may be conveniently removed for replacement when desirable or necessary by simply removing the retaining nut 9.

It is believed that the many advantages of an obstruction remover constructed in accordance with the present invention will be readily understood and although a preferred embodiment of the device is as illustrated and described, it is to be understood that changes in the details of construction may be resorted to which will fall within the scope of the invention as claimed.

What is claimed is:

An obstruction remover of the class described comprising a collapsible cup including an integral socket on its top, a reducing coupling having its small end portion engaged in the socket, a nipple projecting from the small end of the coupling and passing through the top of the cup for establishing communication between said cup and said coupling, a retaining nut for the cup threaded on the nipple, a flexible hose detachably connected to the comparatively large end of the coupling, handles projecting in opposite directions from the coupling, and a manually operable control valve rotatably mounted in the coupling.

JOHN R. WILSON.